United States Patent
Fujita et al.

(10) Patent No.: US 8,786,986 B2
(45) Date of Patent: Jul. 22, 2014

(54) HEAD-SLIDER INCLUDING THIN-FILM MAGNETIC-RECORDING HEAD HAVING REDUCED THERMAL PROTRUSION

(75) Inventors: Shigeo Fujita, Kanagawa (JP); Masahiko Soga, Kanagawa (JP); Hideaki Tanaka, Kanagawa (JP); Yuji Ueda, Kanagawa (JP); Tomohiro Okada, Kanagawa (JP); Takayoshi Ohtsu, Kanagawa (JP); Wataru Kimura, Kanagawa (JP); Yohji Maruyama, Saitama (JP)

(73) Assignee: HGST Netherlands B.V., Amsterdam (NL)

( * ) Notice: Subject to any disclaimer, the term of this patent is extended or adjusted under 35 U.S.C. 154(b) by 352 days.

(21) Appl. No.: 12/642,739

(22) Filed: Dec. 18, 2009

(65) Prior Publication Data

US 2011/0116192 A1    May 19, 2011

(30) Foreign Application Priority Data

Dec. 19, 2008   (JP) .................................. 2008-323474

(51) Int. Cl.
*G11B 5/39*   (2006.01)
(52) U.S. Cl.
USPC .................... 360/235.1; 360/235; 360/320
(58) Field of Classification Search
USPC ...................................... 360/235, 235.1, 320
See application file for complete search history.

(56) References Cited

U.S. PATENT DOCUMENTS

| | | | | |
|---|---|---|---|---|
| 4,499,147 A | * | 2/1985 | Enomoto et al. | 428/428 |
| 4,613,645 A | * | 9/1986 | Robeson et al. | 524/443 |
| 4,664,946 A | * | 5/1987 | Enomoto et al. | 427/126.2 |
| 5,071,792 A | * | 12/1991 | VanVonno et al. | 438/17 |
| 6,661,605 B1 | * | 12/2003 | Pust et al. | 360/125.71 |
| 7,411,264 B2 | * | 8/2008 | Kamarajugadda et al. | 257/422 |
| 7,414,810 B2 | | 8/2008 | Aoki et al. | |
| 8,045,293 B2 | | 10/2011 | Kobayashi et al. | |
| 2005/0219749 A1 | | 10/2005 | Aoki et al. | |
| 2006/0092576 A1 | * | 5/2006 | Ohtsu | 360/319 |
| 2006/0102956 A1 | * | 5/2006 | Kamarajugadda et al. | 257/359 |
| 2007/0002502 A1 | * | 1/2007 | Burbank et al. | 360/319 |
| 2007/0133126 A1 | | 6/2007 | Aoki et al. | |
| 2007/0165329 A1 | | 7/2007 | Aoki et al. | |
| 2008/0023468 A1 | | 1/2008 | Aoki et al. | |
| 2008/0068762 A1 | | 3/2008 | Kobayashi et al. | |
| 2008/0218909 A1 | * | 9/2008 | Kurihara et al. | 360/319 |
| 2009/0141406 A1 | * | 6/2009 | Sasaki et al. | 360/319 |

FOREIGN PATENT DOCUMENTS

| | | |
|---|---|---|
| JP | 2000306213 | 11/2000 |
| JP | 2005-285236 | 10/2005 |
| JP | 2008-52882 | 3/2008 |
| JP | 2008-077719 | 4/2008 |

* cited by examiner

*Primary Examiner* — Wayne Young
*Assistant Examiner* — Carlos E Garcia

(57) ABSTRACT

A head-slider. The head-slider includes a slider, and a thin-film magnetic-recording head. The thin-film magnetic-recording head includes: a read element; a write element; a non-magnetic insulating protective layer disposed around both read and write elements; a resist disposed at a position further away from an air-bearing surface than the read element; and, a hard-material member including a material selected from the group consisting of silicon carbide and tungsten, which is disposed at a position further away from the air-bearing surface than the read element and the write element. Both an end of the resist and an end of the hard-material member overlap the write element when viewed in a stacking direction. A ratio of a distance from the air-bearing surface to a deepest end of the hard-material member to a distance from the air-bearing surface to a deepest end of the resist is at least 0.9.

6 Claims, 11 Drawing Sheets

HEAD-SLIDER INCLUDING THIN-FILM MAGNETIC-RECORDING HEAD HAVING REDUCED THERMAL PROTRUSION

CROSS-REFERENCE TO RELATED APPLICATION

This application claims priority from the Japanese Patent Application No. 2008-323474, filed Dec. 19, 2008, the disclosure of which is incorporated herein in its entirety by reference.

TECHNICAL FIELD

Embodiments of the present invention relate to a head-slider including a thin-film magnetic-recording head including a structure for suppressing thermal protrusion.

BACKGROUND

Disk drives are known in the art that use various kinds of disks, such as: optical disks, magneto-optical disks, flexible magnetic-recording disks, and similar disk data-storage devices. In particular, hard-disk drives (HDDs) have been widely used as indispensable data-storage devices for current computer systems. Moreover, HDDs have found widespread application to motion picture recording and reproducing apparatuses, car navigation systems, cellular phones, and similar devices, in addition to the computers, because of their outstanding information-storage characteristics.

A HDD includes a magnetic-recording disk and a head-slider; data on the magnetic-recording disk are read and written with the head-slider. To increase recording information-storage capacity per unit area on the magnetic-recording disk, areal density of recorded information is increased. However, reduction in recording bit length raises an issue that the areal density cannot be increased beyond a limiting value, known by the term of art, "superparamagnetic limit," determined by thermal fluctuation in magnetization of the recording medium. Generally, the effects of the thermal fluctuation increase as the value of Ku·V/kT is smaller, where: Ku is a magnetic anisotropy constant of the recording medium; V is a minimum unit volume for magnetization in the recording medium; k is a Boltzmann constant; and, T is absolute temperature. Accordingly, Ku or V is increased so as to reduce the effect of the thermal fluctuation in the recording medium of the magnetic-recording disk.

In order to address this issue, as is known in the art, a perpendicular-magnetic-recording (PMR) method has been developed that writes with a magnetic signal perpendicularly on a bilayer PMR medium including a soft-magnetic underlayer with a probe-pole write head. This method can apply a stronger magnetic-recording field to the magnetic-recording disk. Therefore, a recording layer of a magnetic-recording disk with a large magnetic anisotropy constant, Ku, can be used. Moreover, in a magnetic-recording disk in the PMR method, an increase in V may be provided by growing magnetic particles in the film thickness direction while maintaining the magnetic particle diameter on the medium surface small, or maintaining the bit length small.

Another parameter affecting the areal density of recorded information on the PMR medium is the spacing between the thin-film magnetic-recording head and the recording surface of the magnetic-recording disk, known in the art as, "fly height," of the thin-film magnetic-recording head in proximity with a recording surface of the magnetic-recording disk. The fly height may be controlled by a technique known in the art as, "thermal-fly-height control," or "TFC".

Engineers and scientists engaged in HDD manufacturing and development are interested in the design of thin-film magnetic-recording heads in HDDs that increase areal density to meet the rising demands of the marketplace for increased data-storage capacity, performance, and reliability.

SUMMARY

Embodiments of the present invention include a head-slider. The head-slider includes a slider, and a thin-film magnetic-recording head formed by stacking a plurality of layers on the slider. The thin-film magnetic-recording head includes: a read element for reading data; a write element for writing data; a non-magnetic insulating protective layer disposed around the read element and the write element; a resist disposed at a position further away from an air-bearing surface than the read element; and, a hard-material member including a material selected from the group consisting of silicon carbide (SiC) and tungsten (W), which is disposed at a position further away from the air-bearing surface than the read element and the write element. An end of the resist on an air-bearing surface side overlaps the write element when viewed in a stacking direction of the thin-film magnetic-recording head. An end of the hard-material member on the air-bearing surface side overlaps the write element when viewed in a stacking direction of the thin-film magnetic-recording head. A ratio of a distance from the air-bearing surface to a deepest end of the hard-material member to a distance from the air-bearing surface to a deepest end of the resist is at least 0.9.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
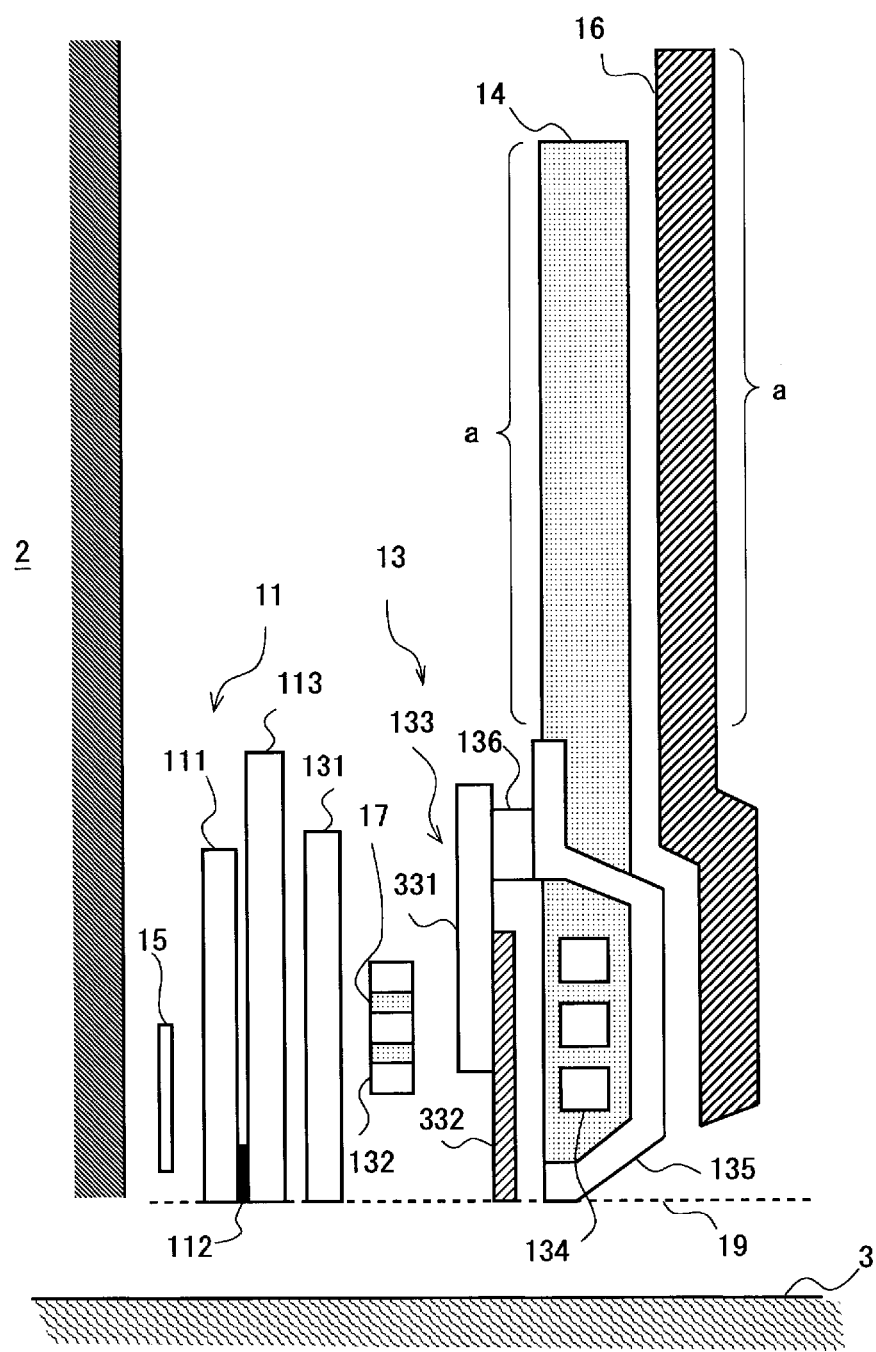
FIG. 1 is a drawing schematically depicting a structure of a thin-film magnetic-recording head in cross-section, in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Figure 12:
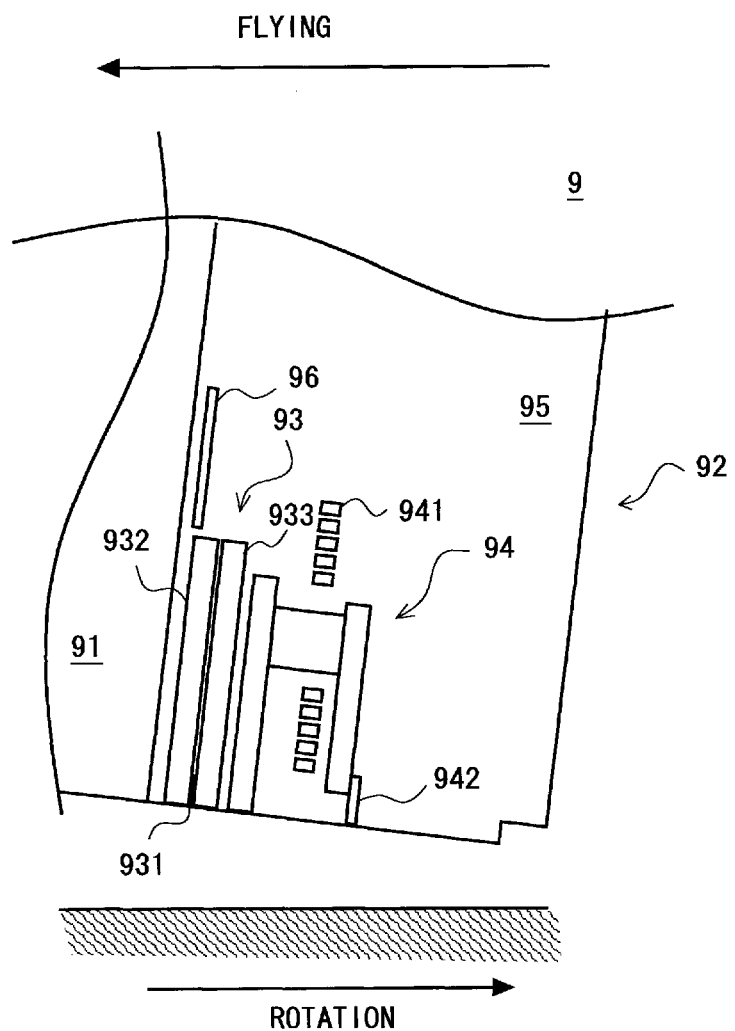
FIG. 12 is a cross-sectional view schematically depicting a structure of a head-slider, as is known in the conventional art.

Description of Embodiments of the Present Invention for a Head-Slider Including a Thin-Film Magnetic-Recording Head Having Reduced Thermal Protrusion With reference now to FIG. 12, with relevance for embodiments of the present invention, a cross-sectional view is shown that depicts a configuration of a thin-film magnetic-recording head 92 in the vicinity of a trailing edge of a head-slider 9, as is known in the art. A thin-film magnetic-recording head 92 is disposed in proximity to the trailing edge of a slider 91. The thin-film magnetic-recording head 92 includes a read head 93 and a write head 94. The write head 94 generates a magnetic field from a main pole 942 induced by electric current flowing through a write coil 941 to write data onto the magnetic-recording disk. The read head 93 includes a magnetoresistive element 931 having magnetic anisotropy and reads data by means of resistance that varies in response to the magnetic field emanating from the magnetic-recording disk.

The thin-film magnetic-recording head 92 is formed on the slider 91 that includes an aluminum/titanium carbide (AlTiC) substrate by a thin-film deposition process. The magnetoresistive element 931 is sandwiched between magnetic shields 932 and 933. A non-magnetic insulating protective film 95 made of alumina, for example, is formed around the write head 94 and the read head 93. A heater element 96 is disposed in proximity to the write head 94 and the read head 93. When the heater element 96 is supplied with electric power, heat generated by the heater element 96 deforms the thin-film magnetic-recording head 92 to cause protrusion. As the amount of the supplied electric power increases, or alternatively, decreases, an amount of the protrusion of the thin-film magnetic-recording head 92 increases, or alternatively, decreases, respectively.

The amount of protrusion of the thin-film magnetic-recording head 92, which is one factor determining the clearance between the magnetic-recording disk and the thin-film magnetic-recording head 92, referred to herein by the term of art, "fly height," varies depending on the temperature in the drive. As the temperature in the drive rises, the amount of protrusion, which is referred to herein by the term of art, "the thermal protrusion," of the thin-film magnetic-recording head 92 increases and the clearance decreases. The thermal protrusion can be compensated for by changing the electric power to be supplied to the heater element 96. The thermal protrusion, however, is different depending on the head, so a certain operating margin is required.

With the advance of HDD technology, the areal density of recorded information has increased: and correspondingly, the clearance has been getting smaller and smaller. The clearance is currently on the order of several nanometers. To control such a microscopic clearance with accuracy, the thermal protrusion of a thin-film magnetic-recording head is minimized. As is known in the art, a first protective layer made of alumina is disposed in the upper portion of the element; and, a second protective layer made of a resist material with a lower Young's modulus than the first protective layer is disposed behind the element.

As is known in the art, the resist member disposed within the thin-film magnetic-recording head provides a reduction in thermal protrusion in the thin-film magnetic-recording head. However, the present inventors have found through their research that the reduction in thermal protrusion by the resist member is insufficient in an HDD, which writes data, or reads data, with extremely small clearance, as used by a current HDD. Accordingly, embodiments of the present invention include a thin-film magnetic-recording head structure that is configured to reduce thermal protrusion to manage such minute clearances in writing data to, or reading data from, a magnetic-recording disk.

In accordance with embodiments of the present invention, a head-slider includes a slider and a thin-film magnetic-recording head formed by stacking a plurality of layers on the slider. In accordance with embodiments of the present invention, the thin-film magnetic-recording head includes: a read element for reading data; a write element for writing data; a non-magnetic insulating protective layer disposed around the read element and the write element; a resist disposed at a position further away from an air-bearing surface (ABS) than the read element, such that an end of the resist on the ABS side overlaps the write element when viewed in a stacking direction of the thin-film magnetic-recording head; and, a hard-material member comprising a material selected from the group consisting of silicon carbide (SiC) and tungsten (W), which is disposed at a position further away from the ABS than the read element and the write element, such that an end of the hard-material member on the ABS side overlaps the write element when viewed in a stacking direction of the thin-film magnetic-recording head. Moreover, in accordance with embodiments of the present invention, a ratio of a distance from the ABS to a deepest end of the hard-material member to a distance from the ABS to a deepest end of the resist is at least 0.9, or more.

In an embodiment of the present invention, the head-slider further includes a coil for generating a magnetic field, such that the coil is formed by connecting conductive lines in an upper layer and conductive lines in a lower layer; and, the resist is disposed behind the conductive lines in the lower layer. Furthermore, in another embodiment of the present invention, the hard-material member is disposed in a lower layer than the conductive lines in the upper layer.

In accordance with embodiments of the present invention, a head-slider includes a slider and a thin-film magnetic-recording head formed by stacking a plurality of layers on the slider. In accordance with embodiments of the present invention, the thin-film magnetic-recording head includes: a read element for reading data; a write element for writing data; a non-magnetic insulating protective layer disposed around the read element and the write element; a resist disposed at a position further away from an ABS than the read element and the write element; a hard-material member comprising a material selected from the group consisting of SiC and W, which is disposed at a position further away from the ABS than the read element and the write element; and, a lower shield and an upper shield sandwiching the read element above and under the read element. Moreover, in accordance with embodiments of the present invention, a ratio of a cross-sectional area of the resist to cross-sectional areas of the lower shield and the upper shield is at least 3.5, or more.

In an embodiment of the present invention, the head-slider further includes a coil for generating a magnetic field, such that the coil is formed by connecting conductive lines in an upper layer and conductive lines in a lower layer; and, the resist is disposed behind the conductive lines in the lower layer. Furthermore, in another embodiment of the present invention, the hard-material member is disposed in a lower layer than the conductive lines in the upper layer.

In accordance with embodiments of the present invention, a head-slider includes a slider, and a thin-film magnetic-recording head formed by stacking a plurality of layers on the slider. In accordance with embodiments of the present invention, the thin-film magnetic-recording head includes: a read element for reading data; a write element for writing data; a non-magnetic insulating protective layer disposed around the read element and the write element; a resist disposed at a position further away from an ABS than the read element and the write element; a hard-material member comprising a material selected from the group consisting of SiC and W, which is disposed at a position further away from the ABS than the read element and the write element; and, a coil for generating a magnetic field, such that the coil is formed by connecting conductive lines in an upper layer and conductive lines in a lower layer. Moreover, in accordance with embodiments of the present invention, the resist is disposed behind either one of the conductive lines in the upper layer and the conductive lines in the lower layer; and, a ratio of a cross-sectional area of the resist to a total cross-sectional areas of the conductive lines in the upper layer and the conductive lines in the lower layer is at least 9, or more.

In an embodiment of the present invention, the resist is disposed behind the conductive lines in the lower layer. Furthermore, in another embodiment of the present invention, the hard-material member is disposed in a lower layer than the conductive lines in the upper layer.

In accordance with embodiments of the present invention, a head-slider includes a slider and a thin-film magnetic-recording head formed by stacking a plurality of layers on the slider. The thin-film magnetic-recording head includes: a read element for reading data; a write element for writing data; a non-magnetic insulating protective layer disposed around the read element and the write element; a resist disposed at a position further away from an ABS than the read element and the write element; a hard-material member comprising a material selected from the group consisting of SiC and W, which is disposed farther from the ABS than the read element; and, a coil for generating a magnetic field, such that the coil is formed by connecting conductive lines in an upper layer and conductive lines in a lower layer. Moreover, in accordance with embodiments of the present invention, the resist is disposed behind either one of the conductive lines in the upper layer and the conductive lines in the lower layer; and, a ratio of a length of the resist in a direction normal to the ABS to a length of either one of the conductive lines in the upper layer and the conductive lines in the lower layer in a normal direction is at least 12, or more.

In an embodiment of the present invention, the resist is disposed behind the conductive lines in the lower layer. Furthermore, in another embodiment of the present invention, the hard-material member is disposed in a lower layer than the conductive lines in the upper layer.

Thus, in accordance with embodiments of the present invention, the thermal protrusion of a thin-film magnetic-recording head in a head-slider can be greatly reduced. Embodiments of the present invention are subsequently described in which a hard disk drive (HDD) is used as an example of a disk drive. Embodiments of the present invention include a HDD that includes a head-slider that includes a structure of a thin-film magnetic-recording head. In one embodiment of the present invention, the thin-film magnetic-recording head in the present embodiment includes a soft material member having a low Young's modulus, and a hard-material member having a high Young's modulus and a low linear expansion coefficient to reduce thermal protrusion. In another embodiment of the present invention, the soft material is resist. In another embodiment of the present invention, a material for the hard-material member having a high Young's modulus and a low linear expansion coefficient is a material selected from the group consisting of SiC and W. In another embodiment of the present invention, the hard-material member and the soft material member are disposed deeper than the read element and the write element, at a location disposed away from the ABS. In another embodiment of the present invention, the hard-material member and the soft material member that are disposed within the thin-film magnetic-recording head produce a synergetic effect that reduces thermal protrusion.

With reference now to FIG. 1, in accordance with an embodiment of the present invention, a cross-sectional view is shown that schematically depicts the structure of a head-slider in the present embodiment. In the following description, a thin-film magnetic-recording head in which SiC is used as the hard-material member and resist as the soft material member is next described in detail. A similar description is applicable to the head with a hard material of W. A thin-film magnetic-recording head 1 is formed on the trailing-edge side of a slider 2. The thin-film magnetic-recording head 1 includes a read head 11 and a write head 13. The thin-film magnetic-recording head 1 is formed on a slider 2 by layering a plurality of films; in FIG. 1, the read head 11 is formed on the slider 2, which is a substrate, and the write head 13 is formed above the read head 11.

The rotational direction of a magnetic-recording disk 3 is from the left of FIG. 1 toward the right. In other words, the thin-film magnetic-recording head 1 travels, in other words, flies, from the right of FIG. 1 toward the left. As shown in FIG. 1 and further described herein, the fore side of the flying thin-film magnetic-recording head 1 is referred to as a leading-edge side; and, the aft side of thin-film magnetic-recording head 1 is referred to as a trailing-edge side. The layers of the thin-film magnetic-recording head 1 are stacked on the slider 2 from the leading-edge side. As shown in FIG. 1 and further described herein, in the description of the thin-film magnetic-recording head 1, a layer closer to the slider 2 is called a lower layer; and, a layer farther from the slider 2 is called an upper layer. Furthermore, the surface of the thin-film magnetic-recording head 1, or alternatively, the head-slider, facing the magnetic-recording disk 3 is called an ABS 19, which may also be referred to herein as the "disk-facing side" of thin-film magnetic-recording head 1, or alternatively, the head-slider.

In the configuration of FIG. 1, the read head 11 is located closer to the leading-edge side of the head-slider than the write head 13; and, the write head 13 is located closer to the trailing-edge side of the head-slider than the read head 11. The read head 11 includes a lower shield 111, a read element including a magnetoresistive sensor 112, and an upper shield 113, which are stacked in this order from the leading-edge side. The magnetoresistive sensor 112 is sandwiched between the two shields 111 and 113, which include magnetic metal. The write head 13 includes: a lower return pole 131, lower thin-film coil conductive lines 132, a main pole 133, upper thin-film coil conductive lines 134, and an upper return pole 135, which are stacked in this order from the leading-edge side. The poles 131, 133, and 135 include a magnetic metal; and, the conductive lines 134 and 135 typically include Cu.

The main pole 133 includes a main pole yoke 331 and a main pole tip 332. The main pole yoke 331 and a main pole tip 332 include a magnetic metal. The main pole yoke 331 is connected to the upper return pole 131 via a back-gap portion 136. The main pole tip 332 is joined with the tip of the main pole yoke 331 on the disk-facing side of the head-slider. The main pole tip 332 defines the data track width. In this instance, one of the two return poles 131 and 135 may be omitted.

The magnetic field flowing from the main pole 133 of the write head 13 passes through a magnetic-recording layer of the magnetic-recording disk 3 and a soft magnetic underlayer of the magnetic-recording disk 3, and enters the return poles 131 and 135, completing a magnetic circuit. This magnetic field writes a magnetization pattern onto a magnetic-recording layer of the magnetic-recording disk 3. In addition, the magnetoresistive (MR) sensor 112 of the read head 11 includes a MR sensor 112 that may be selected from the group consisting of a giant magnetoresistive (GMR) sensor (GMR), a tunneling-magnetoresistive (TMR) sensor, and similar high-sensitivity MR sensors. The magnetic field from the magnetic-recording layer changes the resistance of the magnetoresistive sensor 112. The magnetoresistive sensor 112 converts the change in the magnetization resulting from the passage of the magnetic-recording layer in proximity with the magnetoresistive sensor 112 into an electrical signal in accordance with the change in the resistance, in a so-called "reading operation" of the magnetic-recording disk 3.

The heater element 15 is formed in the layer between the lower shield 111 and the body of the slider 2, and is disposed closer to the leading-edge side of the slider 2 than the lower shield 111 and under the lower shield 111. The heater element 15 may include a winding thin-film resistive element including permalloy. The amount of protrusion of the magnetoresistive sensor 112 and the main pole 133 can be adjusted using the heat from the heater element 15. The heater element 15 may be formed at another location in the thin-film magnetic-recording head, or alternatively, may also be completely absent from the structure of the thin-film magnetic-recording head 1.

The elements of the thin-film magnetic-recording head 1 are surrounded by a non-magnetic insulating protective film. In FIG. 1, in a portion beyond the ABS 19, which lies in a direction away from the magnetic-recording disk 3, the blank space shown around the elements is filled with non-magnetic insulting protective film. A typical non-magnetic insulting protective film includes alumina. The ABS 19 is coated with a carbon overcoat (not shown in FIG. 1).

The lower thin-film coil conductive lines 132 include a plurality of conductive lines arranged in the direction normal to the ABS within the film plane, which is the top-to-bottom direction in FIG. 1; and, a resist 17 of a highly insulating material is disposed among the lower thin-film coil conductive lines 132. Alternatively, the resist 17 may also be completely absent from the structure of the thin-film magnetic-recording head 1. The lower thin-film coil conductive lines 132 and the upper thin-film coil conductive lines 134 are connected to form a helical coil. The helical coil generates a magnetic-recording field. Alternatively, in another embodiment of the present invention, a head-slider may include a coil with conductive lines disposed in a single plane similar to the head-slider shown in FIG. 12.

In accordance with embodiments of the present invention, a resist 14 of a soft material having a low Young modulus and a SiC 16 of a hard material having a high Young's modulus and a low linear expansion coefficient are disposed in the thin-film magnetic-recording head 1. Thus, in accordance with embodiments of the present invention, the coexistence of the resist 14 with the SiC 16 reduces thermal protrusion in the thin-film magnetic-recording head 1. The elements substantially contributing to the thermal protrusion of the thin-film magnetic-recording head 1 are: the write head 13, the heater element 15, and the insulating protective film. There is negligible contribution from the tiny magnetoresistive sensor 112.

The SiC 16 has a higher Young's modulus and a lower linear expansion coefficient than any of the following: the write head 13, the heater element 15, and the insulating protective film. For example, SiC has a Young's modulus of 440 gigapascal (GPa) and a linear expansion coefficient of $3.7 \times E-6$. Nickel iron (NiFe), which is the main magnetic material of the thin-film magnetic-recording head 1, has a Young's modulus of 200 GPa and a linear expansion coefficient of $12.8 \times E-6$. Alumina has a Young's modulus of 138 GPa and a linear expansion coefficient of $7.1 \times E-6$. Thus, in accordance with embodiments of the present invention, SiC is a material suitable for the hard material; but, similar to W, other materials possessing the above-described properties, which might be utilized for component portions within the thin-film magnetic-recording head 1, may also be used.

The soft material is a material having a Young's modulus lower than the hard material by two or more orders of magnitude in GPa. The Young's modulus of a resist that is suitable for the soft material member is 3.7 GPa at 50° C. and does not reach 10 GPa at any temperature. The Young's modulus of the resist is lower than that of any material of the write head 13, the heater element 15, or the insulating protective film by two or more orders of magnitude.

The resist 14 with a low Young's modulus is effective in dissipating the stress caused by a temperature rise within the thin-film magnetic-recording head 1. The SiC 16 with a high Young's modulus maintains stress concentrated on the resist 14. These two effects provide for displacement of the stress toward the disk, and further, dispersion and transfer of the stress in other directions.

In one embodiment of the present invention, as shown in the configuration example in FIG. 1, the resist 14 and the SiC 16 include the respective portions, which are denoted by 'a' in the figure, formed deeper than the write element, which includes: the main pole 133, the lower return pole 131, and the upper return pole 135, namely at a location displaced away from the ABS 19 compared with the above-listed elements of the write element. The resist 14 tends to reduce the thermal protrusion of the read head 11 and the write head 13. The resist 14 disposed on the opposite side of the ABS across the above-described elements can reduce the amount of protrusion of the above-listed elements of the write element. Also, the SiC 16 tends to maintain stress concentrated on the resist 14; and, thus, the SiC 16 may be disposed deeper than the write element, as is the resist 14.

According to one design, in another embodiment of the present invention, the resist 14 and the SiC 16 are disposed deeper than the magnetic shields 111 and 113 as shown in FIG. 1. At the deepest ends of the magnetic shields 111 and 113, compared with the other elements, the magnetic shields 111 and 113 exhibit substantial thermal expansion, so that the resist 14 and the SiC 16 are disposed to effectively reduce the thermal protrusion at the locations where the resist 14 and the SiC 16 are disposed. This configuration provides suppression of the effect of the thermal protrusion on the design of the magnetic shields 111 and 113.

As shown in FIG. 1, in the case that the write head 13 includes a helical coil, portions of the resist 14 and the SiC 16 are disposed deeper than the helical coil. The write head 13 may include a coil configured with conductive lines formed on the same layer similar to the example shown in FIG. 12. The cross-section of the coil includes a portion closer to the ABS and a portion farther from the ABS. According to a design of another embodiment of the present invention, portions of the resist 14 and the SiC 16 are disposed in a portion far from the ABS. If the diameter of the coil is so large and the distance from the ABS to the deep portion is so long that the effect to the thermal protrusion is small, the resist 14 and the SiC 16 may not be disposed deeper than the coil.

In the configuration example in FIG. 1, in another embodiment of the present invention, the resist 14 is disposed deeper than the upper thin-film coil conductive lines 134; and, the upper thin-film coil conductive lines 134 and the resist 14 are disposed at the same layer level with reference to the slider 2. In another example of another embodiment of the present invention, the resist 14 is thicker than the upper thin-film coil conductive lines 134. Hence, the resist 14 is formed in the layer including the layer forming the upper thin-film coil conductive lines 134; and, the top of the resist 14 is upwards form the top of the upper thin-film coil conductive lines 134; and the bottom of the resist 14 is lower than the bottom of upper thin-film coil conductive lines 134. In this regard, however, both the upper thin-film coil conductive lines 134 and the resist 14 may have the same thickness. The upper thin-film coil conductive lines 134 are larger in their cross-section than the lower thin-film coil conductive lines 132; and, the upper thin-film coil conductive lines 134 are also larger in volume than other elements of the thin-film magnetic-recording head 1. Accordingly, the upper thin-film coil conductive lines 134 produce more thermal protrusion.

Accordingly, the resist 14 disposed at this layer level can effectively suppress the thermal protrusion of the thin-film magnetic-recording head 1. As far as a portion of the layer forming the resist 14 is disposed so as to overlap the layer forming the upper thin-film coil conductive lines 134 in an in-plane direction, thermal protrusion can be correspondingly reduced.

In FIG. 1, the resist 14 surrounds the upper thin-film coil conductive lines 134 to function as an insulating layer among those conductive lines. The resist material has a high electrical insulating property, so that the resist material is suitable for insulating the conductive lines of the coil from one another, through which current associated with a write signal flows. The configuration in which the resist 14 for suppressing the thermal protrusion isolates the conductive lines of the coil from one another allows a single process to provide two resists. Moreover, this configuration increases the amount of the resist 14, which reduces thermal protrusion.

Furthermore, in FIG. 1, since the disk-facing-side end of the resist 14 is located at the position overlapping the write head 13 and the read head 11 when viewed in a direction vertical to the film surface, the disk-facing-side end of the SiC 16 is also located at the position overlapping the write head 13 and the read head 11 when viewed in a direction vertical to the film surface.

As shown in FIG. 1, in another embodiment of the present invention, the SiC 16 is disposed further above the resist 14. In another embodiment of the present invention, the SiC 16, which maintains the stress concentrated on the resist 14, is disposed further below or further above the resist 14; and, the slider 2 in a lower layer and the SiC 16 sandwiching the resist 14 allows the resist 14 to dissipate the stress effectively to reduce thermal protrusion.

In another embodiment of the present invention, the resist 14 and the SiC 16 completely cover the elements of the write head 13 and the read head 11 shown in FIG. 1 when viewed from the direction vertical to the film surface. This configuration leads to a greater reduction of thermal protrusion. However, as long as the resist 14 and the SiC 16 are formed so as to cover a portion of the write head 13 and the read head 11, the thermal protrusion can be reduced.

For the SiC 16 to effectively suppress the stress concentrated on the resist 14, in another embodiment of the present invention, the SiC 16 and the resist 14 are formed close to each other. Furthermore, in another embodiment of the present invention, no other member than the insulating protective film may be disposed between the SiC 16 and the resist 14. As exemplified in FIG. 1, in another embodiment of the present invention, in the deeper portion, which is the portion denoted by 'a', the SiC 16 is in contact with the resist 14, so that no other member than the insulating protective film is disposed between the SiC 16 and the resist 14. The matters described above with reference to FIG. 1 may be applicable to the similar structures in other configurations, as well.

Figure 2:
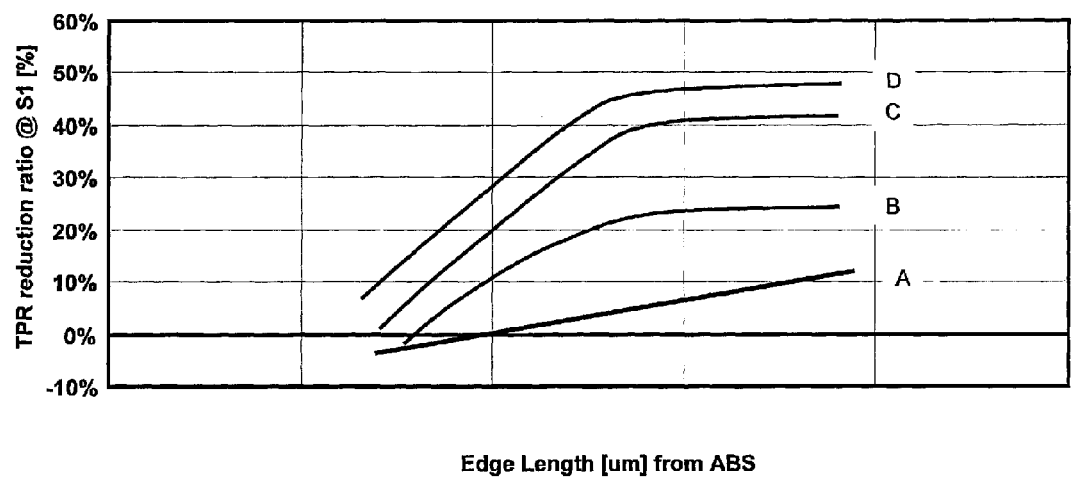
FIG. 2 is a plot of measurement data comparing the thermal protrusion reduction effect of the thin-film magnetic-recording head structure of an embodiment of the present invention with the thermal protrusion of a conventional thin-film magnetic-recording head structure.

With reference now to FIG. 2, in accordance with an embodiment of the present invention, a plot is shown of measurement data comparing the thermal protrusion reduction effect of the thin-film magnetic-recording head structure of an embodiment of the present invention with the thermal protrusion of a conventional thin-film magnetic-recording head structure. In FIG. 2, the Y axis represents the reduction rate of the thermal protrusion and the X axis represents the distance from the ABS to the deepest end of the SiC 16 or the resist 14. The Line A shows the relationship between the distance to the deepest end of the SiC 16 and the thermal protrusion reduction rate in a thin-film magnetic-recording head including only SiC 16, but not a resist 14. The Line B shows the relationship between the distance to the deepest end of the resist 14 and the thermal protrusion reduction rate in a thin-film magnetic-recording head including only a resist 14, but not SiC 16.

The Line C shows the relationship between the distance to the deepest end of the resist 14 and the thermal protrusion reduction rate in a thin-film magnetic-recording head including a resist 14 and SiC 16 of 1.0 micrometer (μm) in thickness. Finally, the line D shows the relationship between the distance to the deepest end of the resist 14 and the thermal protrusion reduction rate in a thin-film magnetic-recording head including a resist 14 and SiC 16 of 2.5 μm in thickness.

As shown in FIG. 2, in a thin-film magnetic-recording head including only either one of the SiC 16 and the resist 14 (the line A or the line B), the thermal protrusion reduction rate is smaller. On the other hand, the thermal protrusion reduction rate in a thin-film magnetic-recording head including both of the SiC 16 and the resist 14 shows a substantial change compared with a thin-film magnetic-recording head including only either one. This indicates that a synergetic thermal protrusion reduction effect is exerted by the coexistence of the SiC 16 and the resist 14. A similar result was obtained in a simulation using W, instead of SiC.

In another embodiment of the present invention, other structural examples of the thin-film magnetic-recording head including the SiC 16 and the resist 14 are next described. In the descriptions of the drawings, parts that are different in the configuration in each drawing are described with particularity; but, descriptions of common parts may be omitted, as appropriate.

Figure 3:
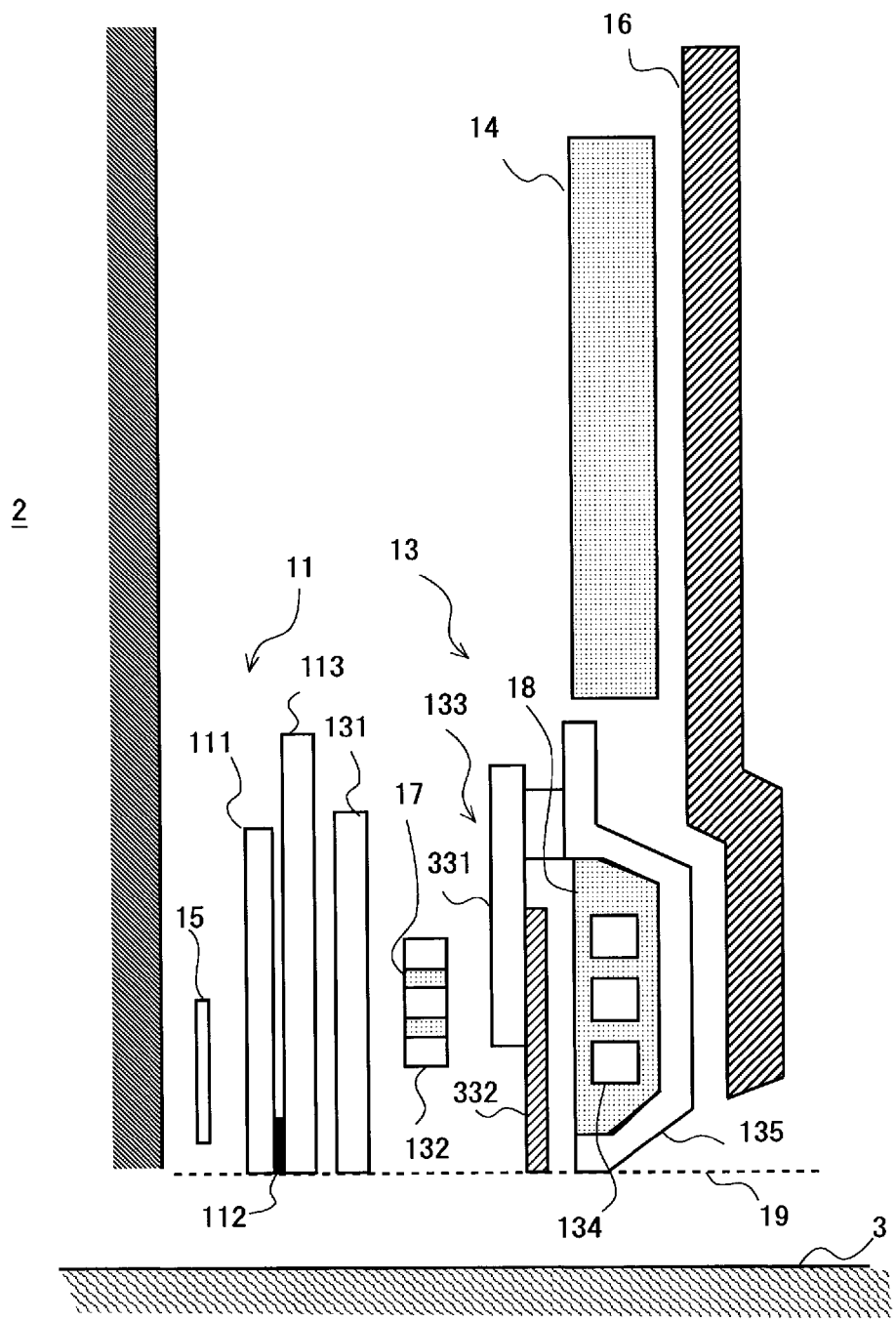
FIG. 3 is a drawing schematically depicting another structure of a thin-film magnetic-recording head in cross-section, in accordance with an embodiment of the present invention.

With reference now to FIG. 3, in accordance with an embodiment of the present invention, a drawing is shown that schematically depicts another structure of a thin-film magnetic-recording head in cross-section. In a thin-film magnetic-recording head, as shown in FIG. 3, the resist 14 may be formed separately from a resist 18 disposed around the upper thin-film coil conductive lines 134. Such a resist 14 also reduces thermal protrusion.

Figure 4:
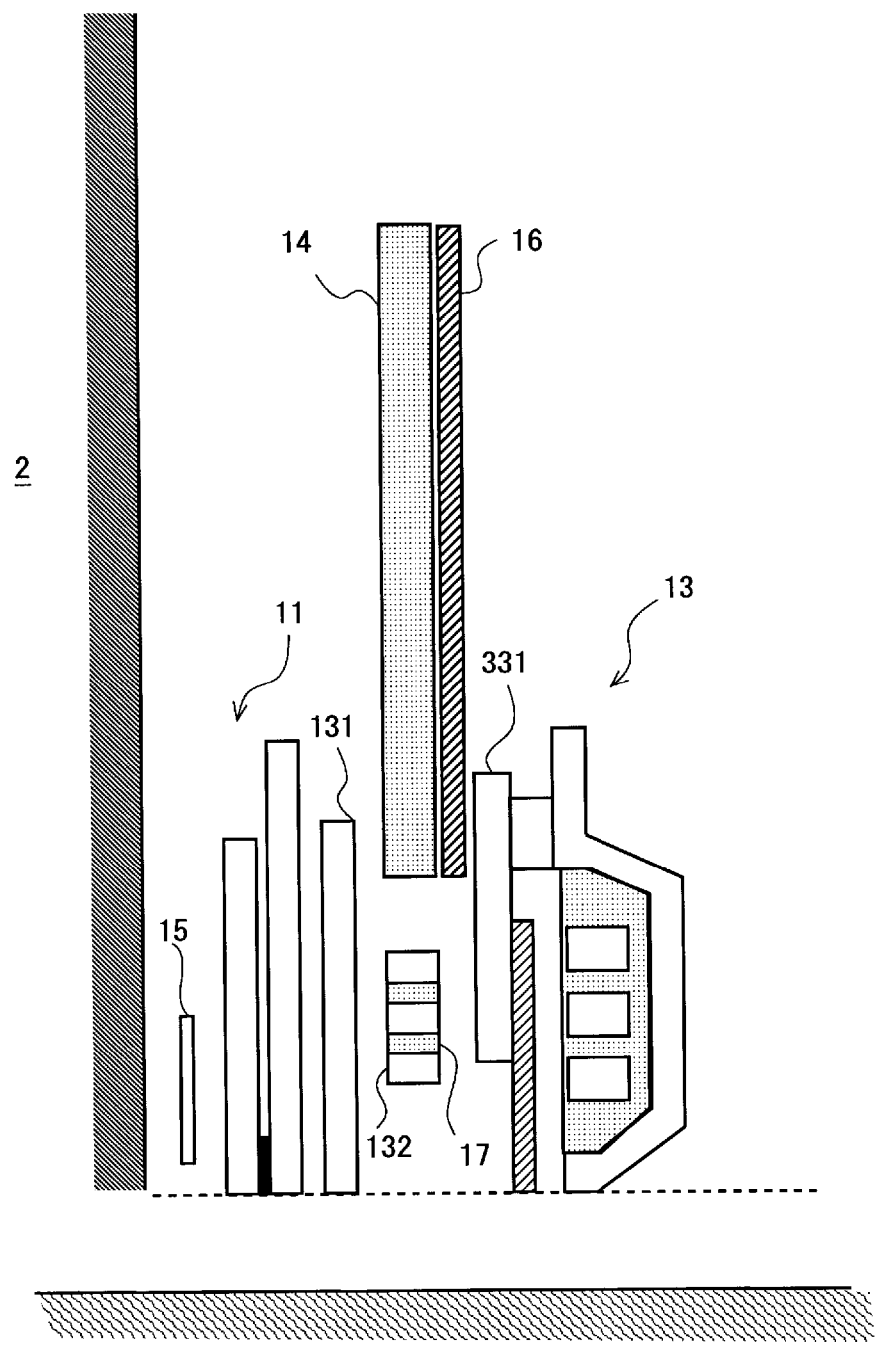
FIG. 4 is a drawing schematically depicting another structure of a thin-film magnetic-recording head in cross-section, in accordance with an embodiment of the present invention.

With reference now to FIG. 4, in accordance with an embodiment of the present invention, a drawing is shown that schematically depicts another structure of a thin-film magnetic-recording head in cross-section. Alternatively, as shown in FIG. 4, the resist 14 may be disposed behind the lower thin-film coil conductive lines 132; and, the SiC 16 may be disposed above the resist 14. The lower thin-film coil conductive lines 132 and the resist 14 are disposed at the same layer level with reference to the slider 2. The lower thin-film coil conductive lines 132 and the resist 14 have the same thickness in the present configuration example, by way of example without limitation thereto, as embodiments of the present invention include lower thin-film coil conductive lines 132 and a resist 14 that may have different thicknesses. A resist 17 is disposed around the lower thin-film coil conductive lines 132 to isolate the conductive lines. The resist 14 does not reach the lower thin-film coil conductive lines 132 and is separated from the resist 17. The resist 17 and the resist 14 disposed at the same layer level and with the same thickness can increase the manufacturing efficiency of head-sliders.

In the configuration example in FIG. 4, the SiC 16 is disposed lower than the upper thin-film coil conductive lines 134 so as not increase the distance between the SiC 16 and the resist 14. More specifically, the SiC 16 is disposed in a layer between the main pole yoke 331 and the lower return pole 131, in similar fashion to the resist 14.

Figure 5:
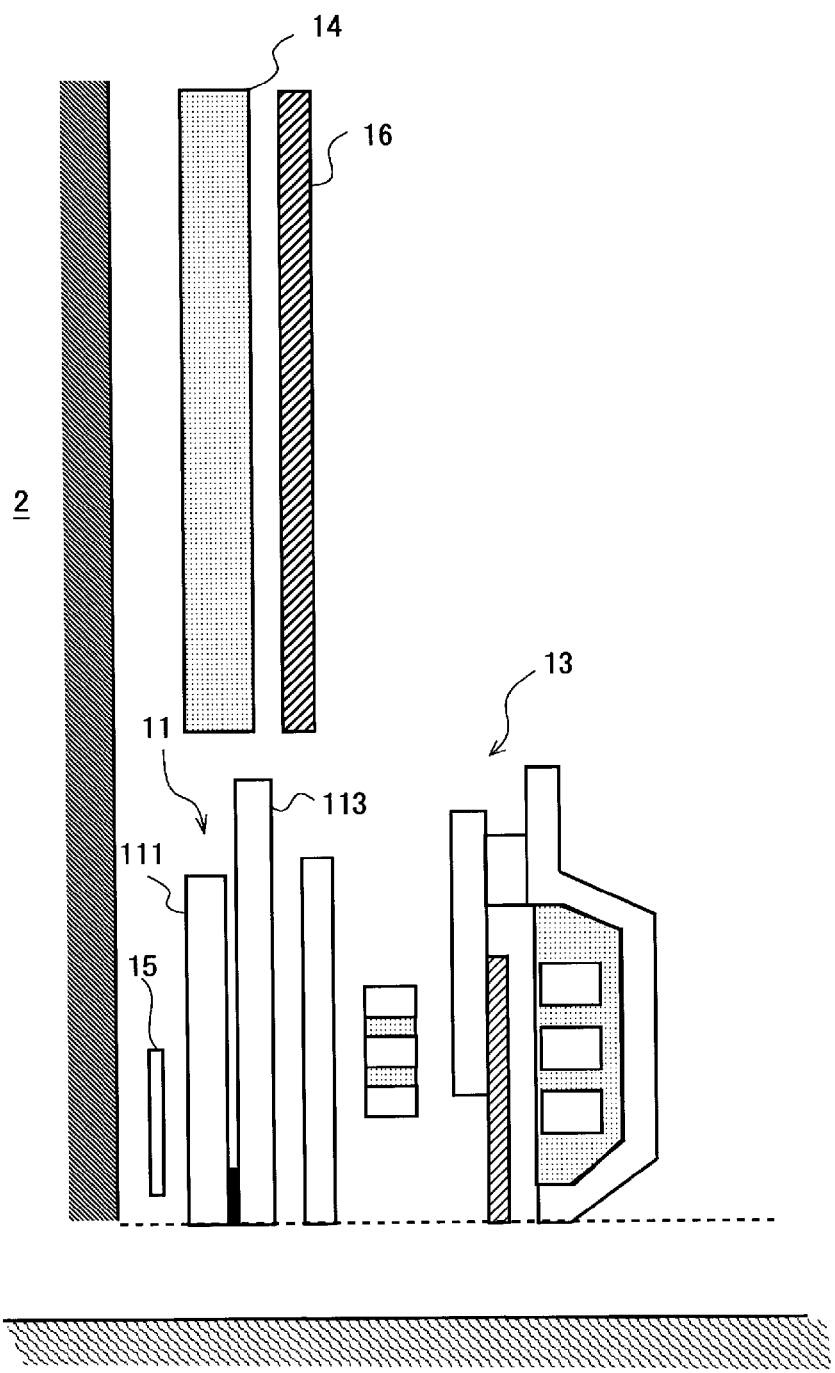
FIG. 5 is a drawing schematically depicting another structure of a thin-film magnetic-recording head in cross-section, in accordance with an embodiment of the present invention.

With reference now to FIG. 5, in accordance with an embodiment of the present invention, a drawing is shown that schematically depicts another structure of a thin-film magnetic-recording head in cross-section. Alternatively, as shown in FIG. 5, the resist 14 may be disposed behind the read head 11 and the SiC 16 may be disposed above the resist 14. The magnetic shields 111 and 113 have substantial volume, so that the magnetic shields 111 and 113 greatly contribute to thermal protrusion of the thin-film magnetic-recording head. Accordingly, at least a portion of the resist 14 is disposed so as to overlap with at least a portion of the layers of the magnetic shields 111 and 113 to effectively reduce thermal protrusion.

Figure 6:
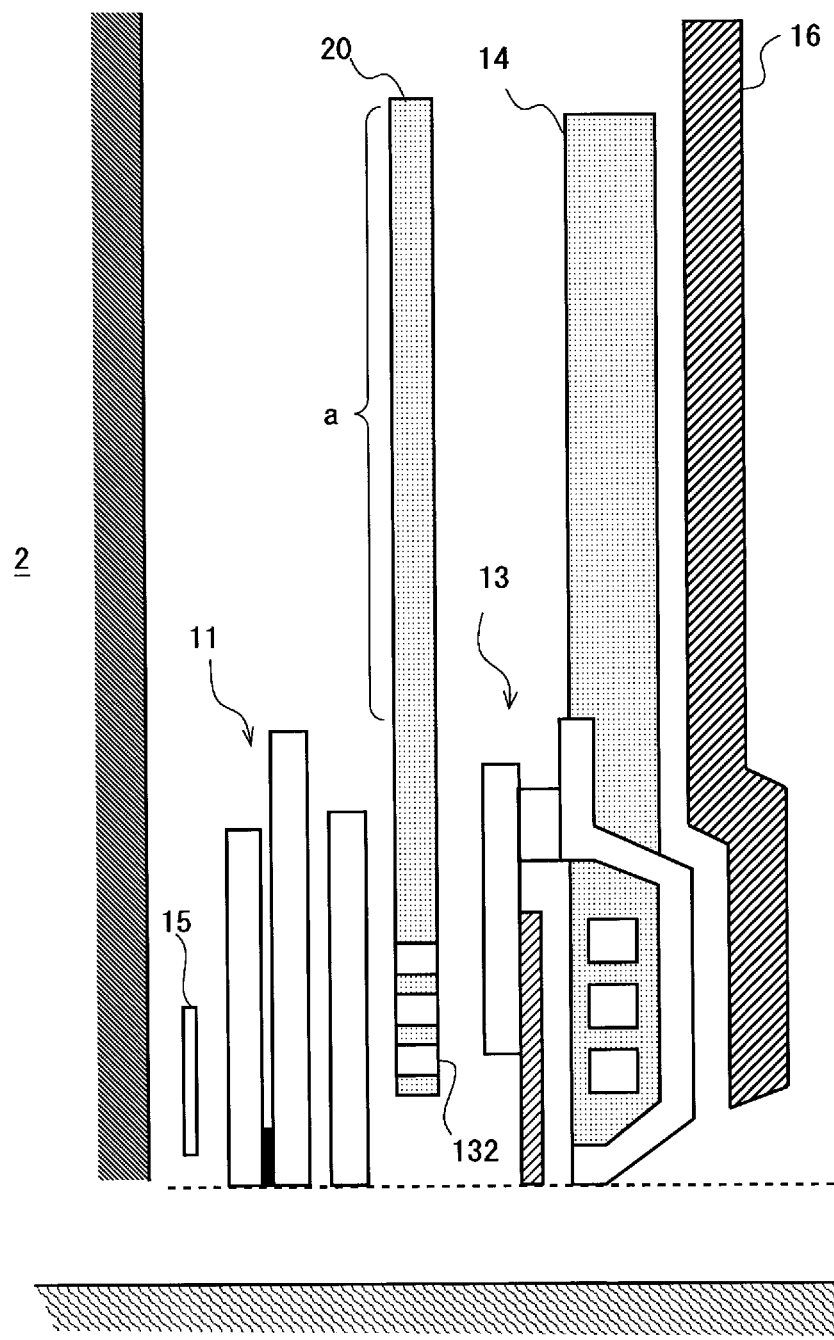
FIG. 6 is a drawing schematically depicting another structure of a thin-film magnetic-recording head in cross-section, in accordance with an embodiment of the present invention.

With reference now to FIG. 6, in accordance with an embodiment of the present invention, a drawing is shown that schematically depicts another structure of a thin-film magnetic-recording head in cross-section. FIG. 6 shows a structure of a thin-film magnetic-recording-head structure exhibiting a greater thermal protrusion reduction effect. In the configuration example in FIG. 6, in another embodiment of the present invention, the thin-film magnetic-recording head includes two separate layers of resists 14 and 20. The configuration of FIG. 6 is made by adding the resist 20 to the configuration of FIG. 1. A plurality of resists produces a greater thermal protrusion reduction effect. The resist 20 includes a portion located deeper than the write and read heads 11 and 13, which is denoted by 'a', similar to the resist 14. Excepting the configuration for the resist 20 in FIG. 6, the description of FIG. 1 is also applicable to the configuration in FIG. 6.

In the configuration example of FIG. 6, in another embodiment of the present invention, the resist 20 disposed behind the lower thin-film coil conductive lines 132 reaches the lower thin-film coil conductive lines 132 to isolate conductive lines from one another. The configuration in which the resist 20 for reducing the thermal protrusion isolates the conductive lines of the coil from one another allows a single process to provide two resists. Furthermore, the amount of the resist 20 increases to increase the thermal protrusion reduction effect. The resist 20 is as thick as the lower thin-film coil conductive lines 132, but, alternatively, may be thicker than that shown in FIG. 6. Moreover, in another embodiment of the present invention, the resist 20 reaches the lower thin-film coil conductive lines 132; but, the resist 20 may also be formed separated from the lower thin-film coil conductive lines 132. In such a configuration, in another embodiment of the present invention, another resist is disposed around the lower thin-film coil conductive lines 132.

The SiC 16 is disposed upwards from the two resists 14 and 20. To enhance the suppressive effect on thermal protrusion, another SiC may be disposed between the two resists 14 and 20. Increasing the SiC or the resist, however, may complicate the structure of the thin-film magnetic-recording head, and lowers manufacturing efficiency. Accordingly, in another embodiment of the present invention, an appropriate number of SiC and resists are located at appropriate locations in accordance with the design of the individual thin-film magnetic-recording head.

In another embodiment of the present invention, a relationship between elements in a thin-film magnetic-recording head including the resist and the SiC is next described in detail. In the following description, the measurement result on a sample using SiC will be described; but, a similar measurement result was obtained through a simulation using a head-slider with a hard material composed of W.

Figure 7:
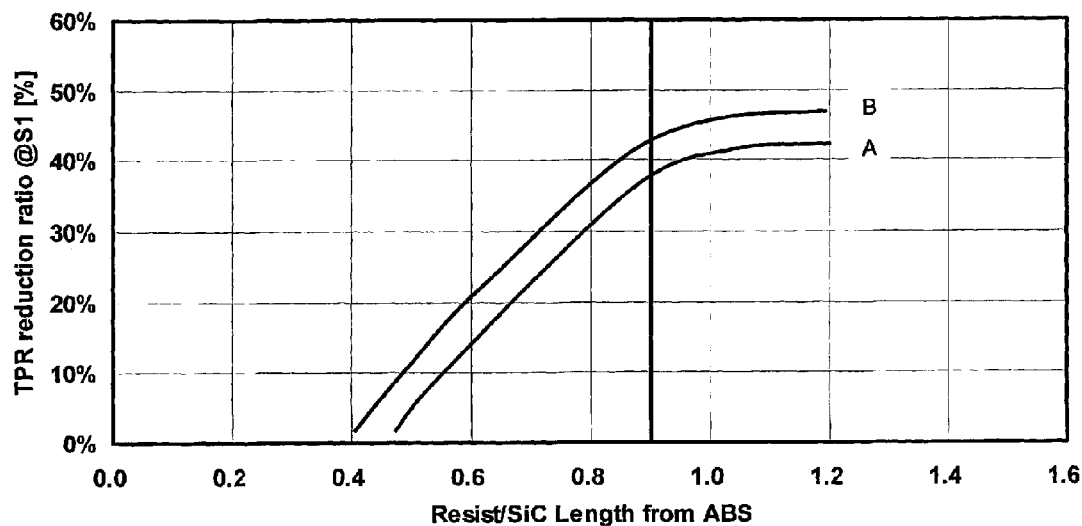
FIG. 7 is a plot of measurement data showing the relationship of the ratio (Ls/Lh) of the distance Ls from the air-bearing surface (ABS) to the deepest end of the resist to the distance Lh from the ABS to the deepest end of the silicon carbide (SiC), and the reduction rate of the thermal protrusion, in accordance with an embodiment of the present invention.
Figure 8:
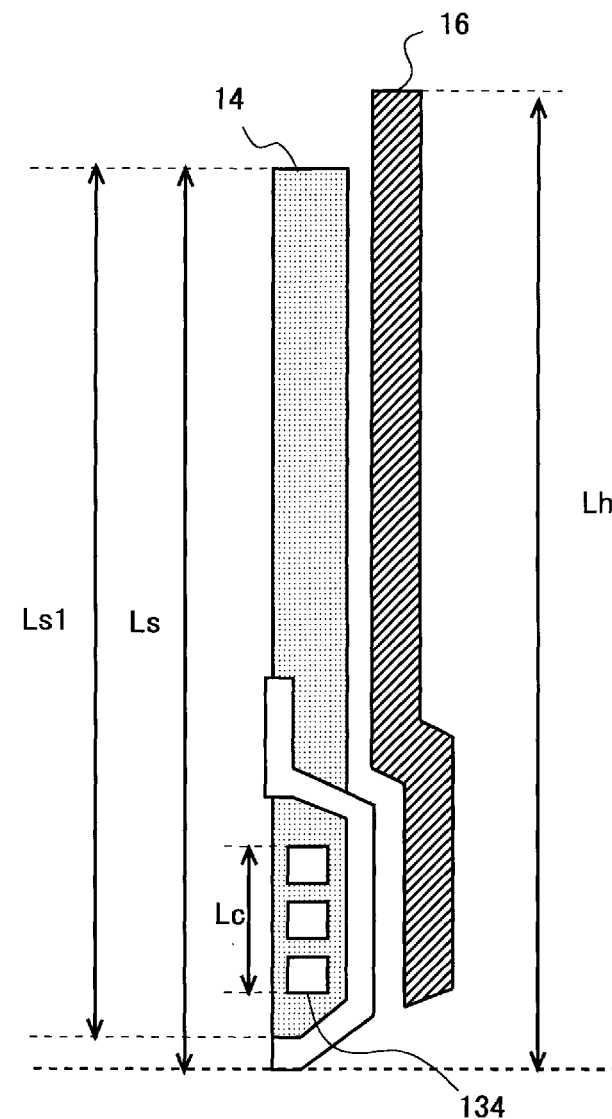
FIG. 8 is a drawing showing a detail in cross-section of a portion of the structure shown in FIG. 1, in accordance with an embodiment of the present invention.

With reference now to FIGS. 7 and 8, in accordance with embodiments of the present invention, in FIG. 7, a plot is shown of measurement data that shows the relationship of the ratio (Ls/Lh) of the distance Ls from the ABS to the deepest end of the resist to the distance Lh from the ABS to the deepest end of the SiC, and the reduction rate of the thermal protrusion; and, in FIG. 8, a drawing is shown that shows a detail in cross-section of a portion of the structure shown in FIG. 1. The distance Lh and the distance Ls are exemplified in FIG. 8. The deepest ends of the SiC and the resist do not always agree with the center of the main pole. The X-axis of FIG. 7 represents the ratio (Ls/Lh), and the Y-axis represents the reduction rate of the thermal protrusion. Measurement was made on a thin-film magnetic-recording head including the structure shown in FIG. 1. In FIG. 7, line A indicates the measurement data on a SiC with a thickness of 1.0 µm; and, line B indicates the measurement data on a SiC with a thickness of 2.5 µm.

In each of the data-plots of lines A and B, the thermal protrusion decreases until the ratio (Ls/Lh) reaches 0.9 and are substantially saturated at 0.9. Accordingly, in another embodiment of the present invention, the ratio (Ls/Lh) of the length Ls of the resist to the length Lh of the SiC is at least 0.9 or more. The measurement result is related to the ratio between the length of the SiC and the length of the resist and may also be applied to the structures illustrated in FIGS. 3 to 6. The relationship between the cross-sectional area of the resist and the cross-sectional area of the coil is next described with reference to FIG. 9.

Figure 9:
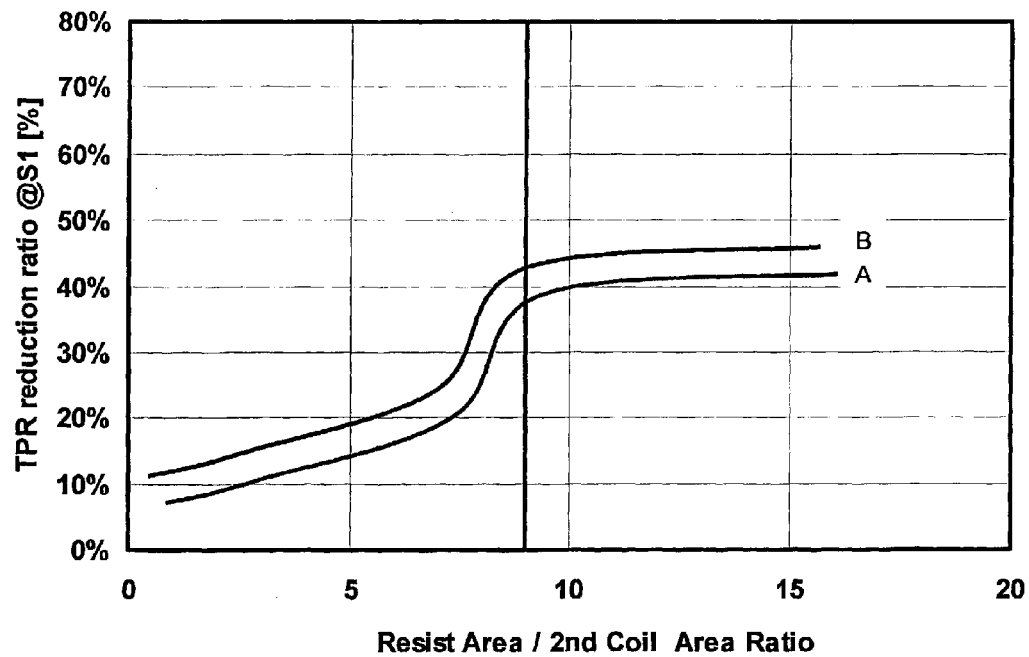
FIG. 9 is a plot of measurement data showing the relationship between the ratio (Ss/Sc) of the resist cross-sectional area Ss to the coil cross-sectional area Sc and the reduction rate of the thermal protrusion, in accordance with an embodiment of the present invention.

With reference now to FIG. 9, in accordance with embodiments of the present invention, a plot is shown of measurement data that shows the relationship between the ratio (Ss/Sc) of the resist cross-sectional area Ss of the resist 14 to the coil cross-sectional area Sc, which is the cross-sectional area of the upper thin-film coil conductive lines 134, and the reduction rate of the thermal protrusion. The resist cross-sectional area Ss and the coil cross-sectional area Sc are the cross-sectional areas cut along the center of the ABS and the center of the main pole. The X-axis of FIG. 9 represents the ratio (Ss/Sc), and the Y-axis represents the reduction rate of the thermal protrusion. Measurement was made on a thin-film magnetic-recording head including the structure shown in FIG. 1.

In FIG. 9, line A indicates the measurement data on a SiC with a thickness of 1.0 µm; and, line B indicates the measurement data on a SiC with a thickness of 2.5 µm. In each of the data-plots of lines A and B, the thermal protrusion decreases substantially until the ratio (Ss/Sc) reaches 9 and is substantially saturated at 9. Accordingly, in another embodiment of the present invention, the ratio (Ss/Sc) of the resist cross-sectional area Ss to the coil cross-sectional area Sc is at least 9, or more. The measurement result is related to the ratio between the coil cross-sectional area and the resist cross-sectional area in a helical coil and may also be applied to the lower thin-film coil conductive lines 132. The relationship between the length of the resist and the length of the thin-film coil conductive lines is next described with reference to FIG. 10.

Figure 10:
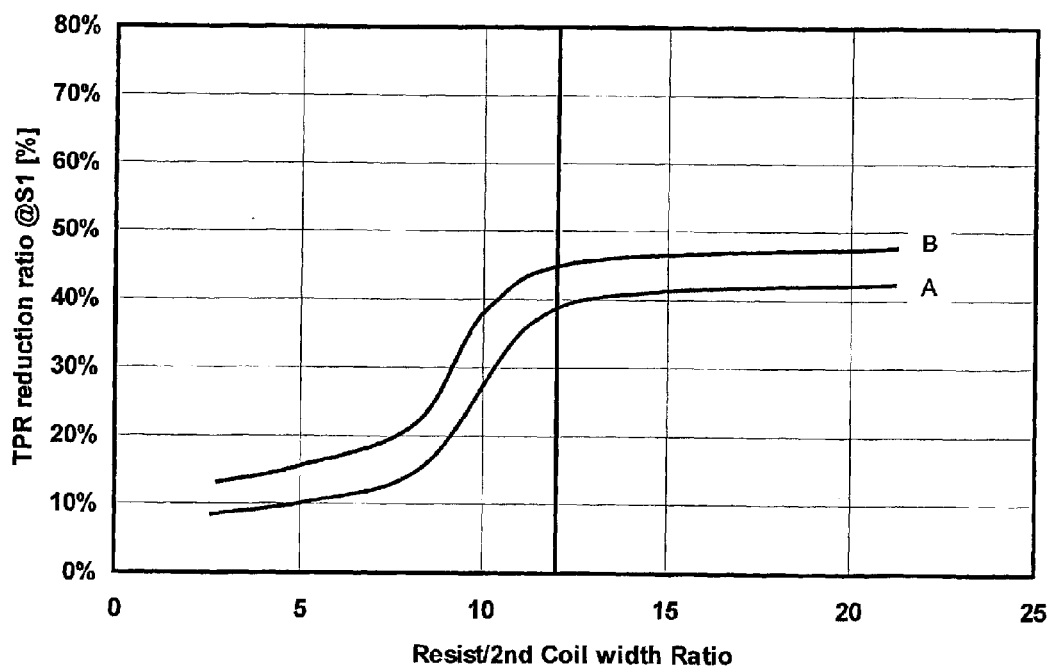
FIG. 10 is a plot of measurement data showing the relationship of the ratio (Lsl/Lc) of the length Lsl of the resist to the length Lc of the thin-film coil conductive lines and the reduction rate of the thermal protrusion, in accordance with an embodiment of the present invention.

With reference now to FIG. 10, in accordance with embodiments of the present invention, a plot is shown of measurement data that shows the relationship of the ratio (Lsl/Lc) of the length Lsl of the resist to the length Lc of the thin-film coil conductive lines and the reduction rate of the thermal protrusion. With further reference to FIG. 8, the length Lsl of the resist 14 and the length Lc of the upper thin-film coil conductive lines 134 are exemplified. These lengths Lsl and Lc are the lengths when cut along the center of the ABS and the center of the main pole. FIG. 10 shows measurement data indicating the relationship of the ratio (Lsl/Lc) of the length Lsl of the resist to the length Lc of the thin-film coil conductive lines and the reduction rate of the thermal protrusion. The X-axis of FIG. 10 represents the ratio (Lsl/Lc), and the Y-axis represents the reduction rate of the thermal protrusion. Measurement was made on a thin-film magnetic-recording head including the structure shown in FIG. 1.

In FIG. 10, line A indicates the measurement data on a SiC with a thickness of 1.0 µm; and, line B indicates the measurement data on a SiC with a thickness of 2.5 µm. In each of the data-plots of lines A and B, the thermal protrusion substantially decreases until the ratio (Lsl/Lc) reaches 12, and is substantially saturated at 12. Accordingly, in another embodiment of the present invention, the ratio (Lsl/Lc) of the length Lsl of the resist to the length Lc of the thin-film coil conductive lines is at least 12, or more. The measurement result is related to the ratio between the coil length and the resist length in a helical coil and may also be applied to the lower thin-film coil conductive lines 132. Finally, the relationship between the cross-sectional area of the resist and the cross-sectional area of the magnetic shield is next described with reference to FIG. 11.

Figure 11:
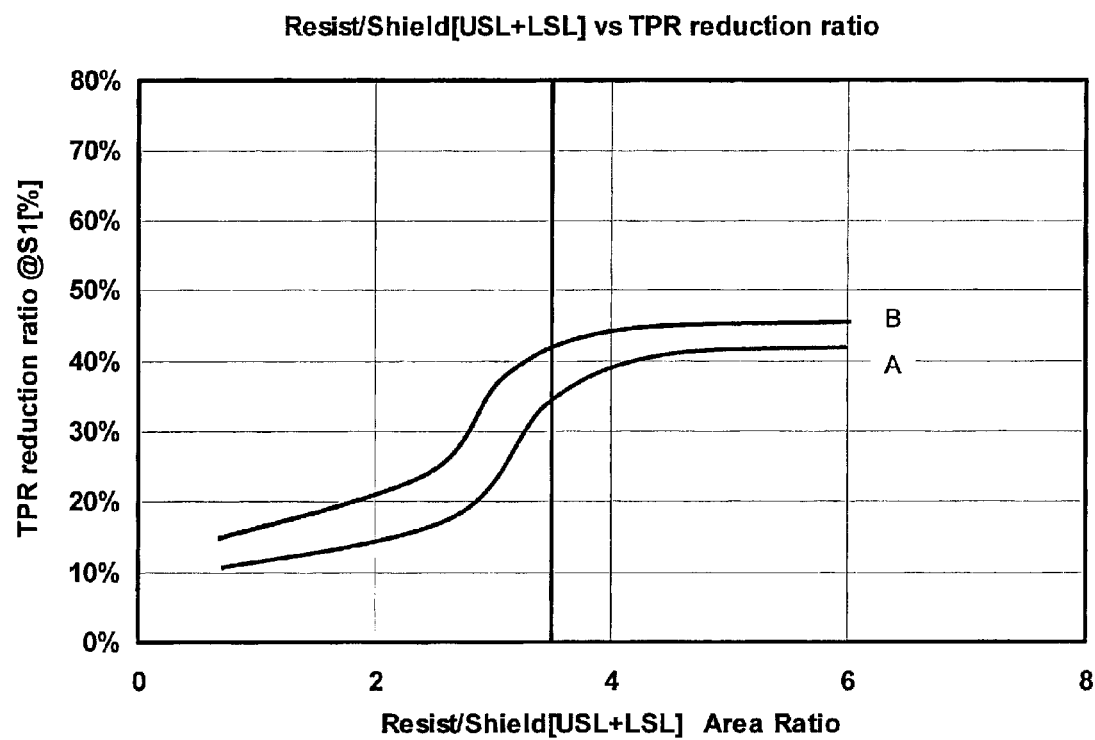
FIG. 11 is a plot of measurement data showing the relationship between the ratio (Ss/Sm) of the resist cross-sectional area Ss to the coil cross-sectional area Sm of the magnetic shield and the reduction rate of the thermal protrusion, in accordance with an embodiment of the present invention.

With reference now to FIG. 11, in accordance with embodiments of the present invention, a plot is shown of measurement data that shows the relationship between the ratio (Ss/Sm) of the resist cross-sectional area Ss of the resist 14 to the coil cross-sectional area Sm of the magnetic shield, and the reduction rate of the thermal protrusion. The cross-sectional areas Ss and Sm are the cross-sectional areas cut along the center of the ABS and the center of the main pole. The X-axis of FIG. 11 represents the ratio (Ss/Sm), and the Y-axis represents the reduction rate of the thermal protrusion. Measurement was made on a thin-film magnetic-recording head including the structure shown in FIG. 1. The cross-sectional area of the magnetic shield is the sum of the cross-sectional areas of the lower shield 111 and the upper shield 113.

In FIG. 11, line A indicates the measurement data on a SiC with a thickness of 1.0 µm and line B indicates the measurement data on a SiC with a thickness of 2.5 µm. In each of the data-plots of lines A and B, the thermal protrusion drastically decreases until the ratio (Ss/Sm) reaches 3.5, and is substantially saturated at 3.5. Accordingly, in another embodiment of the present invention, the ratio (Ss/Sm) of the resist cross-sectional area Ss to the magnetic shield cross-sectional area Sm is at least 3.5, or more.

As set forth above, embodiments of the present invention have been described by way of examples; but, embodiments of the present invention are not limited to the above-described examples, as embodiments of the present invention can, of course, be modified, added to, and/or elements of the examples converted in various ways within the spirit and scope of embodiments of the present invention. For example, embodiments of the present invention include disk drives with data-storage disks other than magnetic-recording disks used in HDDs, such as: optical disks, and magneto-optical disks, by way of example without limitation thereto. The present invention may be applied to disk drives other than HDDs or head-sliders including other coil structures than a helical coil, within a possible range.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head-slider comprising:
a slider; and
a thin-film magnetic-recording head formed by stacking a plurality of layers on said slider, said thin-film magnetic-recording head comprising:
- a read element for reading data;
- a write element for writing data;
- a non-magnetic insulating protective singular layer disposed around said read element and said write element, such that said non-magnetic insulating protective singular layer surrounds said read element and said write element;
- a resist disposed at a position further away from an air-bearing surface than said read element, an end of said resist on an air-bearing surface side overlapping said write element when viewed in a stacking direction of said thin-film magnetic-recording head; and
- a hard-material member having a thickness less than said resist and disposed directly adjacent to said resist and extending in a vertical direction away from said air-bearing surface farther than said resist and comprising a material selected from the group consisting of silicon carbide and tungsten, which is disposed at a position further away from said air-bearing surface than said read element and said write element, an end of said hard-material member on said air-bearing surface side overlapping said write element when viewed in a stacking direction of said thin-film magnetic-recording head, and a ratio of a distance from said air-bearing surface to a deepest end of said hard-material member to a distance from said air-bearing surface to a deepest end of said resist being at least 0.9.

2. The head-slider of claim 1, further comprising:
a coil for generating a magnetic field, said coil being formed by connecting conductive lines in an upper layer and conductive lines in a lower layer;
wherein said resist is disposed behind said conductive lines in said lower layer.

3. The head-slider of claim 2, wherein said hard-material member is disposed in a lower layer than said conductive lines in said upper layer.

4. A head-slider comprising:
a slider; and
a thin-film magnetic-recording head formed by stacking a plurality of layers on said slider, said thin-film magnetic-recording head comprising:
- a read element for reading data;
- a write element for writing data;
- a non-magnetic insulating protective singular layer disposed around said read element and said write element, such that said non-magnetic insulating protective singular layer surrounds said read element and said write element;
- a resist disposed at a position further away from an air-bearing surface than said read element and said write element;
- a hard-material member having a thickness less than said resist and disposed directly adjacent to said resist and extending in a vertical direction away from said air-bearing surface farther than said resist and comprising a material selected from the group consisting of silicon carbide and tungsten, which is disposed at a position further away from said air-bearing surface than said read element and said write element; and
- a lower shield and an upper shield sandwiching said read element above and under said read element, a ratio of a cross-sectional area of said resist to said cross-sectional areas of said lower shield and said upper shield being at least 3.5.

5. The head-slider of claim 4, further comprising:
a coil for generating a magnetic field, said coil being formed by connecting conductive lines in an upper layer and conductive lines in a lower layer;
wherein said resist is disposed behind said conductive lines in said lower layer.

6. The head-slider of claim 5, wherein
said hard-material member is disposed in a lower layer than said conductive lines in said upper layer.

* * * * *